Inventors
Pierre Essinger
Evon C. Greanias
Philip F. Meagher
By John A. Harvey
Attorney

VIDEO SIGNAL GENERATOR

Filed Dec. 31, 1963 2 Sheets-Sheet 2

Inventors
Pierre Essinger
Evon C. Greanias
Philip F. Meagher
By John A. Harvey
Attorney United States Patent Office 3,265,812
Patented August 9, 1966

3,265,812
VIDEO SIGNAL GENERATOR
Pierre Essinger, Yorktown Heights, Evon C. Greanias, Chappaqua, and Philip F. Meagher, Mount Kisco, N.Y., assignors to International Business Machines Corporation, New York, N.Y., a corporation of New York
Filed Dec. 31, 1963, Ser. No. 334,824
9 Claims. (Cl. 178—7.2)

Figure 1:
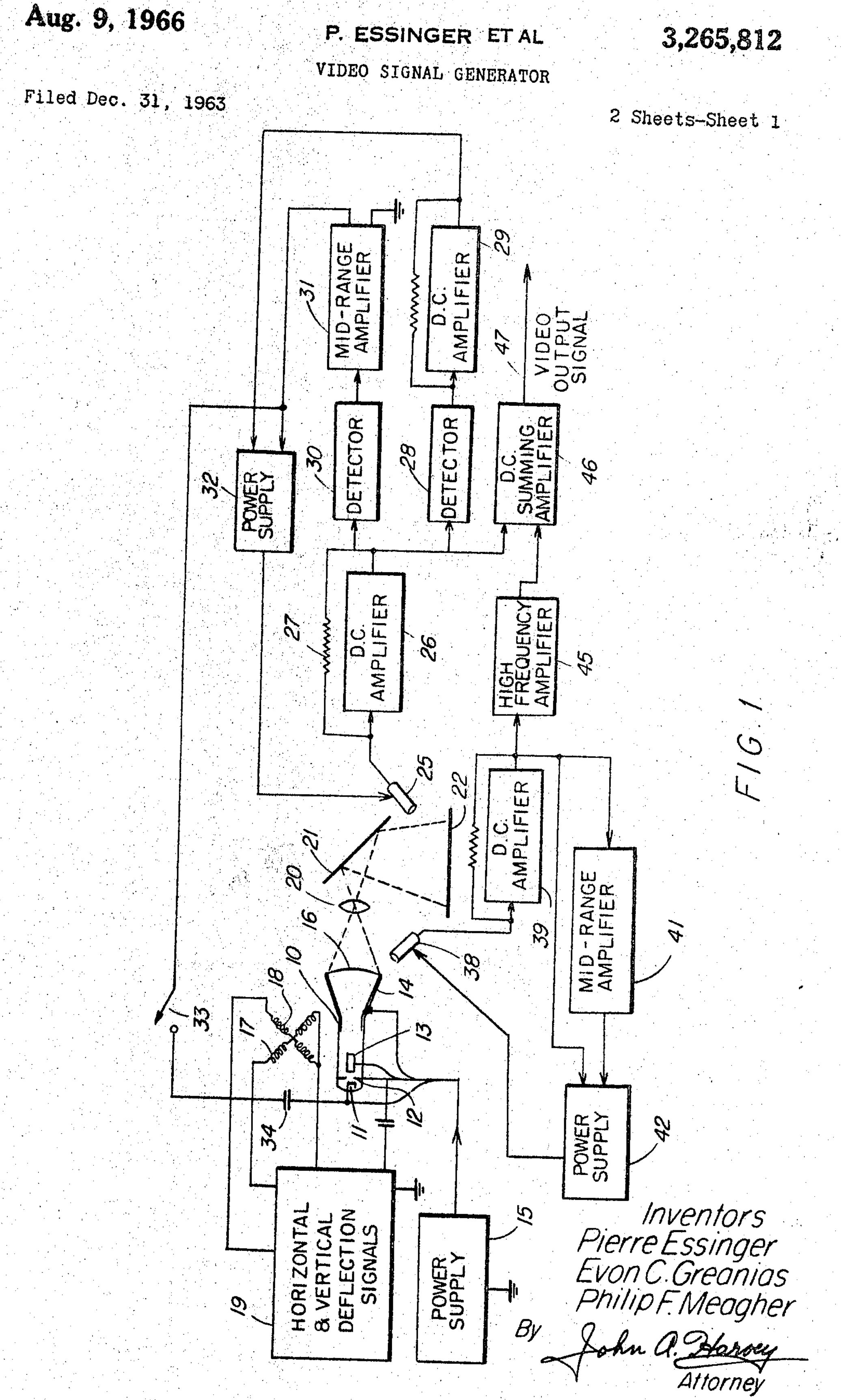

The present invention relates to video signal generators and, more particularly, to arrangements for generating a video signal by the use of a moving spot of light which traces a scan raster to explore incremental-area brightness contrasts of an image to be transmitted. The invention has particular utility for video signal generation by use of so-called flying spot scanners wherein the electron beam of a cathode ray tube is focused to a small high-intensity luminous spot on the fluorescent screen of the tube and is deflected in two directions at different velocities to create parallel scanning lines suitable for exploratory illumination of an image area.

Flying spot scanners are widely used as scanners of moving picture film in television video signal generation. They have also found utility in character recognition applications wherein the brightly luminous trace pattern of the cathode ray tube is imaged onto the surface of a printed or handwritten document. Light reflected from the document, and modulated in intensity by the contrast between the printed or handwritten characters and the background surface upon which they appear, is received by a photo-multiplier tube to generate a form of video signal which may then be used to recognize individual ones of successively printed or written characters. Representative arrangements of this nature are disclosed in the Meagher et al. application Serial No. 305,254 filed August 29, 1963 and the Greanias application Serial No. 248,585, filed December 31, 1962, both assigned to the same assignee as the present application. In document scanning applications, exaggerated increase of contrast is desirable whereas softening or reduction of contrast is undesirable and variations from relatively uniform contrast may often prove troublesome in attaining high accuracy of character recognition. When video signals as produced by a flying spot scanner source of document illumination and associated photo-multiplier tube, it has been found that the level of the video signal is undesirably subject to a number of prevailing operational conditions. Among these is the photo-multiplier tube multiplication ratio change by reason of tube drift and its sensitivity to variations of its electrical energization, variation of light collection efficiency on different parts of the document, non-uniform aging of areas of the fluorescent phosphor screen of the cathode ray tube, and variations of scanning spot luminous intensity due to variations of electron gun electrical energization and incremental-area phosphor luminous efficiency which creates undesirable phosphor "noise" in the video signal.

It is an object of the present invention to provide a new and improved video signal generator particularly suitable for document character recognition applications, and one which avoids one or more of the disadvantages and limitations of prior such generators.

It is a further object of the invention to provide a novel video signal generator which incorporates compensation for undesirable variations of image-exploratory scanning light intensity and includes compensation for high-frequency variations occasioned by phosphor "noise" prevalent in flying spot scanners.

Figure 2:
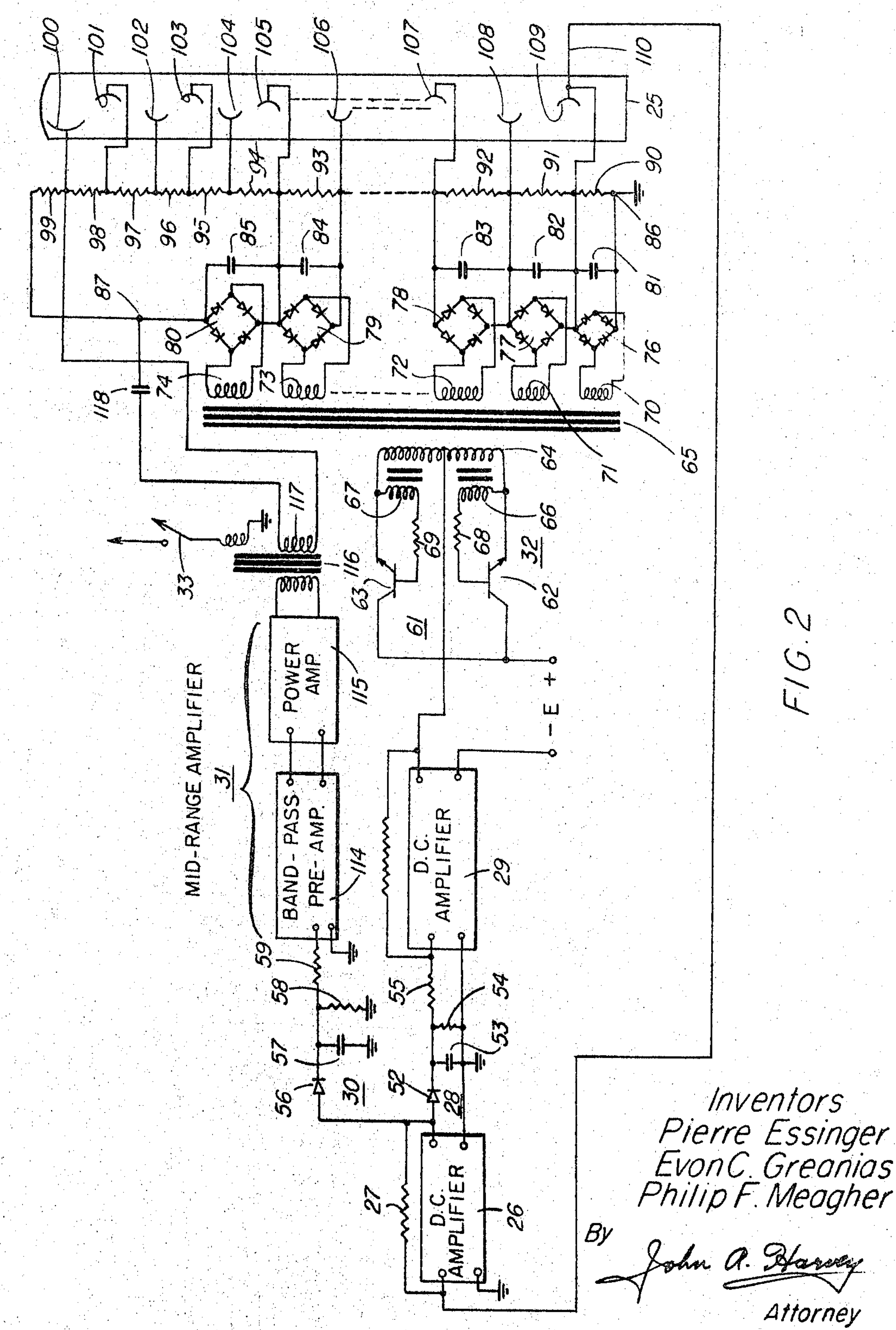

Other objects and advantages of the invention will appear as the detailed description proceeds in the light of the drawings forming a part of this application and in which:

FIG. 1 represents in block diagram form the electrical arrangement of a video signal generator embodying the present invention in a particular form suitable for document character recognition applications and using a flying spot scanner; and FIG. 2 shows schematically the electrical circuit arrangement of a controlled power supply system used in the FIG. 1 generator for energizing a photomultiplier tube employed therein.

Referring now more particularly to FIG. 1, the video signal generator is shown as employing a conventional form of flying spot scanner which includes a cathode ray tube 10 having a cathode electrode 11, a beam-intensity control electrode 12, and first and second anodes 13 and 14 all energized by a power supply system 15. The electron beam of the tube 10 is focused by a conventional magnetic field focusing structure, not shown, to a small high-intensity spot on the fluorescent screen 16 of the tube 10 and is deflected in two directions normal to one another and at different velocities by horizontal and vertical magnetic deflection fields produced by 90° oriented windings 17 and 18 individually energized by saw tooth scanning currents supplied by a deflection signal generator unit 19. There is thus created on the fluorescent screen 16 of the tube 10 a small spot of high luminous intensity which moves at uniform but high velocity along a linear horizontal line trace and moves at uniform but slower velocity vertically to trace successive ones of parallel scanning lines uniformly spaced from top to bottom of the fluorescent screen. The image of the moving spot is at all times projected by a lens system 20 and mirror 21 onto a document 22 to explore the incremental area brightness contrasts of printed or handwritten characters appearing thereon.

Light reflected from the surface of the document 22 is modulated in intensity by the scanning spot exploration of the image appearing on the document, and this modulated reflected light is received by a photo-multiplier tube 25 which operates in conventional manner to create and amplify an electrical video signal. This video signal is applied from an output circuit of the tube 25 to the input circuit of a conventional direct-current amplifier 26, indicated as having substantial direct-current degenerative feedback through a resistor 27 coupling its output circuit to its input circuit. Such amplifiers conventionally have essentially constant input-circuit to output-circuit gain from zero frequency (direct current) to about 2,000 cycles per second with a higher frequency "roll off" rate of about 20 db per decade to a zero db frequency of about $2\times10^6$ cycles per second. They typically exhibit an input circuit impedance greater than about $10^4$ ohms, an output circuit voltage of $\pm.50$ volts at an ouput current of $\pm.50$ milliamperes.

The video signal amplified by the amplifier 26 is peak-rectified by a detector 28, and the direct current and low frequency alternating current components are supplied to the input circuit of a direct current amplifier 29 similar to the amplifier 26. The amplified video signal in the output circuit of the amplifier 26 is also supplied to a peak detector 30, and the midrange frequency components of the video signal are applied to a midrange amplifier 31 having substantially uniform gain from about 10 cycles per second to 5,000 cycles per second. The amplified signals of both of the amplifiers 29 and 31 are supplied to a power supply system 32 to control, in a manner to be explained more fully hereinafter, the magnitude of the energizing potentials developed by the power supply system and supplied to energize the numerous electrodes of the photo-multiplier tube 25. The amplified midrange frequency components of the video signal may also be supplied, if desired, from the amplifier 31 through the closed contacts of a switch 33 and a coupling condenser 34 to the cathode electrode 11 of the cathode ray tube 10 for modulation of the cathode ray beam of the latter.

A photo-multiplier tube 38 is positioned to view the illuminated screen 16 of the cathode ray tube 10 and to generate in an output circuit of the tube 38 an electrical signal having an instantaneous amplitude varying with the instantaneous luminous intensity of the luminous scanning spot as it traces the raster of parallel scanning lines on the fluorescent screen 16. This electrical signal is supplied to the input circuit of a conventional direct current amplifier 39 similar to the amplifiers 26 and 29. The midrange frequency components of the signal developed in the output circuit of the amplifier 39 are amplified by a midrange amplifier 41, having the same construction as the midrange amplified 31. The amplified midrange signal components developed in the output circuit of the amplifier 41 and the amplified signal developed in the output circuit of the amplifier 39 are supplied to individual control circuits of a power supply system 42 to control the magnitudes of the voltages developed by the supply system 42 and supplied to energize the numerous electrodes of the photo-multiplier tube 38.

The amplified signal appearing in the output circuit of the amplifier 39 contains certain high frequency phosphor "noise" components presently to be considered more fully, and these high frequency components are translated through a high frequency amplifier 45 to the input circuit of a direct current summing amplifier 46. The amplified video signal appearing in the output circuit of the amplifier 26 is also applied to the input circuit of the amplifier 46 but with opposite polarity to the high frequency phosphor "noise" components supplied to the latter from the amplifier 45. An amplified video signal, relatively free of high frequency phosphor "noise" components, is developed in the output circuit 47 of the amplifier 46 for translation to utilizing equipment not shown.

In considering the operation of the video signal generator just described, it may be pointed out at the outset that the video signal developed in the output circuit of the photo-multiplier tube 25 by operation of the flying spot scanner source of illumination of the document 22 causes several forms of undesirable spurious amplitude variations to appear in the video signal. Certain of these are occasioned by changes in the multiplication ratio of the photo-multiplier tube 25 due to well known drift of the tube operational characteristics and its sensitivity to variations of its electrical energization from the power supply system 32. A further undesirable spurious amplitude variation of the video signal is occasioned by variation of the efficiency with which reflected light is collected by the photo-multiplier tube 25 from different areas of the document 22. Further undesirable spurious amplitude variations of the video signal are occasioned by non-uniform aging of areas of the fluorescent screen 16 and to non-uniform area response of the fluorescent screen to the electron beam of the cathode ray tube 10, to variations of the scanning spot luminous intensity due to variations of the electrical energization of the cathode ray tube 10 beam-forming electrodes, and to incremental-area phosphor luminous efficiency occasioned by the particulate structure of the fluorescent screen 16 and which results in undesirable phosphor "noise" frequency components.

Aside from the phosphor "noise" amplitude variations of the video signal, the other undesirable amplitude variations of the video signal are either long-term variations of those occurring at relatively low frequency or are variations that occur at midrange frequencies. For example, undesirable amplitude variations of the video signal resulting from variation of light collection efficiency by the photo-multiplier tube 25 may occur at a midrange frequency if the light collection efficiency varies along a horizontal line scanning movement of the scanning light spot or may occur at a relatively low frequency if the collection efficiency varies in the vertical direction of light spot scanning of the document.

The low frequency and midrange frequency undesirable amplitude variations which tend to appear in the video signal generated by the photo-multiplier tube 25 are amplified by the amplifier 26, are peak detected by the detectors 28 and 30, and are amplified by a respective one of the amplifiers 29 and 31. The amplified signals of the latter amplifiers so control the power supply system 32 as to vary the energization of the photo-multiplier tube 25 to such extent and in such sense as substantially to reduce the low frequency and midrange frequency undesirable amplitude variations of the video signal. In this, the detectors 28 and 30 sense any amplitude variations of the video signal occurring from zero (direct current) frequency to an upper frequency limit of the midrange frequency band translated by the amplifier 31. Each of the detectors 28 and 30 include capacitive and resistive components as will presently be explained more fully, and these components are selected to provide a sufficiently long peak detector time constant that each detector is relatively insensitive to the relatively wide band of higher frequency amplitude modulation components which carry the video information of the video signal. Thus the amplitude control exercised by the units 26 and 28–32 over the video signal developed in the output circuit of the photo-multiplier tube 25 affects compensation only of undesirable video signal peak amplitude variations without affecting the video information carried by the signal.

The units 26 and 28–32 will be recognized as comprising a feedback loop which operates to receive the video output signal of the photo-multiplier tube 25 and, by feedback energization control over the latter, maintain the amplitude of the video signal substantially constant with respect those amplitude variations which fall within the range of relatively low frequencies to which the detectors 28 and 30 are responsive. This amplitude control is effective to compensate not only for any operational condition which otherwise changes the multiplication ratio (gain) of the photo-multiplier tube 25 itself, but also for those which effect changes in the luminous intensity of the scanning spot produced by the cathode ray tube 10 or which are occasioned by changes of the efficiency with which reflected light is collected by the photo-multiplier tube 25. Any such operational condition which tends to change the luminous intensity of the scanning spot, such as changes of energization of the cathode ray tube 10 by the power supply 15 or non-uniform aging of areas of the fluorescent screen 16 of the tube 10, can be further compensated by closing the switch 33 to supply to the cathode 11 of the tube 10 the midrange-frequency video signal components from the amplifier 31. This video signal energization of the cathode 11 modulates the cathode ray beam to such extent and in such sense as to maintain substantially constant the luminous intensity of the scanning spot with respect luminous intensity variations occurring at frequencies within the midrange band translated by the amplifier 31. If non-uniform aging of areas of the fluorescent screen 16 is a contributory factor to such change of scanning spot luminous intensity, however, the feedback of signal components to the cathode 11 as last described is undesirable from the standpoint that it accelerates further aging of the deficient screen areas and thus aggravates the condition which gives rise to these undesirable amplitude variations of the video signal.

The operation effected by the components 38–52 is very similar to that just described but with the difference that no video signal is involved. The photo-multiplier tube 38 monitors the prevailing luminous intensity of the scanning spot created on the fluorescent screen 16 of the cathode ray tube 10, and there is developed in an output circuit of the tube 38 an electrical monitor signal which varies in amplitude with variations of the scanning spot intensity. The very low frequencies components, from direct current to perhaps a 100 or so cycles, of this monitor signal are translated with substantial amplitude by the amplifier 39 to a control circuit of the power supply unit 42. A midrange band of lesser-amplitude frequency components of the monitor signal are amplified by the amplifier 41 and are supplied to a second control signal of the power supply unit 42. The latter, under control of the amplified signals of the amplifiers 39 and 41, varies the energization of the electrodes of the photo-multiplier tube 38 to control the multiplication ratio (gain) of this tube. This control is of such extent and is in such sense as substantially to reduce the magnitude of all low-frequency and midrange frequency amplitude variations tending to appear in the output monitor signal of the photo-multiplier tube 38. The units 39–42 thus provide for the tube 38 an amplitude control feedback loop similar in arrangement and operation to that provided for the video signal photo-multiplier tube 25. The concurrent control of the photo-multiplier tubes 25 and 38 by their associated feedback loops has particular significance in connection with reduction of the phosphor "noise" contributed to the generated video signal by the inherent characteristics of the fluorescent screen 16.

The fluorescent screen of a cathode ray tube is conventionally formed by settling phosphor particles out of suspension in a liquid vehicle. After the screen has been settled and the liquid vehicle decanted, the screen is dried and the fabrication of the tube then progresses to completion. This screen formation process results in a layer of discrete phosphor particles adhering to the inner surface of the face plate of the tube. As a finely-focused electron beam scans the fluorescent screen of the finished tube to create a luminous scanning spot, the particulate characteristic of the screen causes the luminous intensity of the scanning spot to vary within a small intensity range and at relatively high frequencies related to the range of phosphor particle sizes used in forming the fluorescent screen. These intensity variations become more pronounced as the scanning spot is reduced in size to attain higher definition in exploring the image details of a scanned document, and are undesirable since they create a band of high-frequency "noise" in the video signal produced by the document scanning operation.

As earlier explained, the feedback loops associated with the photo-multiplier tubes 25 and 38 operate to maintain substantially constant the peak amplitude of the video signal produced in the output circuit of the tube 25 and the peak amplitude of the monitor signal developed in the output circuit of the tube 38. In doing so, the amplitudes of phosphor "noise" components appearing in the video and monitor signals are also maintained substantially constant. It will be evident that any given instantaneous change of scanning spot intensity will produce corresponding concurrent amplitude changes of the video and monitor signals. Accordingly, when the video signal of the amplifier 26 and the high frequency phosphor "noise" components of the monitoring signal translated by the amplifier 45 are concurrently supplied with opposed instantaneous polarities to the input circuit of the summing amplifier 46, the phosphor "noise" components appearing in the video signal are reduced in amplitude or are effectively canceled by the amplifier 46 so that the video signal appearing in the output circuit 47 of the summing amplifier is essentially free of phosphor "noise." The amplifiers 26 and 39 have similar constructions and accordingly have equal phase shifts for the phosphor "noise" frequency components, and a high frequency amplifier 45 of conventional construction preferably should introduce a minimum of phase shift with respect the band of high frequency components which make up the phosphor "noise." This enables the opposite polarity phosphor "noise" frequency components of the video and monitor signals to cancel one another in the input circuit of the summing amplifier 46.

FIG. 2 is a circuit diagram representing the electrical circuit arrangement of the detectors 28 and 30, their associated respective amplifiers 29 and 31, the power supply unit 32, and the photo-multiplier tube 25. A similar circuit arrangement is employed for the photomultiplier tube 38 and its associated feedback loop components 39–42. The peak detector 28 is shown in FIG. 2 as comprised by a series diode rectifier device 52, a shunt connected condenser 53 with parallel connected resistor 54, and a series output-circuit isolating resistor 55. The time constant of the condenser 53 and resistor 54 is made sufficiently long by selection of the values of these components that only the lowest frequency components (including the direct current component) of the video signal are detected by the detector 28 and are supplied through the output circuit isolating resistor 55 to the input circuit of the amplifier 29. The peak detector 30 similarly includes a series diode rectifier device 56, a shunt connected condenser 57 and parallel connected resistor 58, and an output circuit series isolating resistor 59. The time constant of the condenser 57 and resistor 58 is selected sufficiently long that the detector 30 responds only to the midrange frequency amplitude variations of the video signal.

The power supply unit 32 is comprised by a self-oscillatory inverter 61 of conventional arrangement, and is energized through the output circuit of the amplifier 29 from a source of unidirectional energizing voltage E. The power supply includes power transistors 62 and 63 which alternately energize the center tapped primary winding 64 of a saturable core output transformer 65. The transistors 62 and 63 are rendered alternately conductive by conventional feedback windings 66 and 67 which energize the base electrodes of the respective transistors 62 and 63 through respective current-limiting resistors 68 and 69. The output transformer includes a plurality of secondary windings 70–74 which are connected to individual ones of a plurality of full-wave diode rectifier bridges 76–80 as shown. The output terminals of each rectifier bridge are connected to an individual one of a plurality of filter condensers 81–85 connected in series relation with one another between a ground terminal 86 and a high voltage output terminal 87. The filter condensers 81–84 are connected across individual ones of respective resistors 90–93 which are serially connected to provide a resistive potential divider, and the filter condenser 85 is connected across a plurality of resistors 94–99 which are serially connected as additional components of the resistive voltage divider last mentioned. The photo-multiplier tube 25 includes a photo emissive cathode 100 which is energized from the junction of the voltage divider resistors 98 and 99, and includes a succession of electron multiplier electrodes 101–104 which are energized as shown by individual potentials developed at the junction points of the voltage divider resistors 94–98. The electron multiplier electrodes 101–104 are those which first receive the stream of electrons emitted by the photo sensitive cathode 100 and comprising the generated video signal, and operate with relatively low electrode currents so that they may all be energized by that portion of the resistive potential divider which is comprised by the resistors 94–98. The photo-multiplier tube 25 includes a succession of further electron multiplier electrodes 105–109 which require larger operating currents by reason of their operation with an amplified electron stream, and accordingly these electrodes are energized as shown by current supplied directly to them from the filter condensers 81–84. The amplified video signal is developed in an output circuit 110 of the highest current electron multiplier electrode 109 of the tube 25, and is supplied to the input circuit of the amplifier 26 as shown.

The midrange amplifier 31 is shown in FIG. 2 as being comprised by a high gain pre-amplifier 114 and a power amplifier 115. The input of the pre-amplifier 114 is coupled to the output circuit of the peak detector 30, and the frequency pass band of this amplifier selects the mid frequency range of video signal components which are to be amplified and translated to the power amplifier 115.

The latter includes an output transformer 116 having a secondary winding 117 which is coupled through a coupling condenser 118 directly across the resistor 99 of the resistive potential divider which is comprised by the resistors 94–99.

In considering the operation of the FIG. 2 arrangement, it will be evident that the energization of the self-oscillatory inverter 61 is dependent in part upon the magnitude of the amplified output voltage developed in the output circuit of the amplifier 29. As the peak amplitude of the video signal voltage developed by the peak detector 28 increases, the output voltage of the amplifier 29 decreases to reduce the energization supplied to the inverter 61. This results in a reduction of the amplitudes of the alternating voltages developed in the secondary windings 70–74 of the inverter transformer 65, and reduces the magnitudes of the unidirectional energizing voltages applied to all of the electrodes of the photo-multiplier tube 25. The multiplication ratio of the tube 25 is correspondingly reduced, and the peak amplitude of the video signal developed in the output circuit 110 of the tube 25 is smaller than it otherwise would be. Conversely, a reduced peak amplitude of the video signal voltage developed by the peak detector 28 increases the energization of the electrodes of the photo-multiplier tube 25. The resultant increased multiplication ratio of the latter increases the peak amplitude of the video signal developed in the output circuit 110. Thus any change of the peak amplitude of the video signal effects an inverse change of the multiplication ratio of the photo-multiplier tube 25 by changed energization of all of the electrodes of this tube, and the resultant net change of video signal amplitude is correspondingly very small and becomes smaller as the gain of the feedback loop increases.

The video signal voltage developed in the output circuit of the peak detector 30 is amplified by the amplifiers 114 and 115 and is applied through the output transformer 116 to change the instantaneous value of voltage developed across the resistive potential divider resistor 99 and thus the instantaneous unidirectional energizations of the photo cathode 100 and multiplier electrodes 101–105 of the tube 25. This is an alternating current change of energization resulting from the midrange frequency amplitude changes of the video signal, and is such that an instantaneous increase of video signal amplitude effects a decrease of unidirectional energization of the electrodes 100–105 to reduce the multiplication ratio (and thus the gain) effected by the tube 25. Conversely, an instantaneous reduction of video signal amplitude at the detector 30 increases the multiplication ratio of the tube 25. It will be noted that this alternating current energization control is accomplished at the low-current-level electrodes 100–105 of the photo-multiplier tube 25 where the control may be more readily effected. This "low level" control of the multiplication ratio of the tube 25 is satisfactory, however, since the amplitudes of the higher frequency amplitude variations tending to appear in the video signal at the detector 30 are usually much smaller than those at the detector 28. Here again, the resulting net higher frequency amplitude changes of the video signal are reduced with increasing values of gain of the midrange feedback loop.

As earlier mentioned, an arrangement similar to FIG. 2 is used with respect the FIG. 1 photo-multiplier tube 38 and associated feedback loop units 39–42 to maintain substantially constant the peak amplitude of the monitor signal developed in the output circuit of the tube 38.

It will be apparent from the foregoing description of the invention that a video signal generator embodying the invention is one particularly suitable for document character recognition applications and compensates for many operational conditions which tend undesirably to change the peak amplitude of the generated video signal. A video signal generator embodying the invention not only compensates for video signal peak amplitude changes occurring at relatively low frequencies, but also enables compensation for high-frequency amplitude variations occasioned by phosphor "noise" prevalent in flying spot scanners.

While a specific form of the invention has been described for purposes of illustration, it is contemplated that possible changes may be made without departing from the spirit of the invention.

What is claimed is:

1. A video signal generator comprising means for creating and projecting onto an image to be transmitted a moving spot of light tracing a scan raster to explore incremental-area reflection brightness contrasts of said image, photo-multiplier means responsive to light energy reflected from said image and modulated in intensity by the light-spot exploratory scanning thereof for generating an electrical video signal having an instantaneous amplitude at least in part proportional to the incremental-area image reflective brightness and to the prevailing peak intensity of said light spot, means for deriving a first electrical control signal having an amplitude proportional to the average prevailing peak intensity of said light spot and a second electrical control signal having an amplitude proportional to the prevailing image reflective peak brightness during scanning by said light spot, and means responsive to said control signals for varying inversely with changes in the amplitude of each thereof the multiplication ratio of said photo-multiplier means to reduce variations in the peak amplitude of said generated video signal resulting from variations in the average peak intensity of said light spot and the reflective peak brightness of said image.

2. A video signal generator comprising means for creating and projecting onto an image to be transmitted a moving spot of light tracing a scan raster to explore incremental-area reflection brightness contrasts of said image, a source of electrical energization, a photo-multiplier tube energized by said source and responsive to light energy reflected from said image and modulated in intensity by the light-spot exploratory scanning thereof for generating an electrical video signal having an instantaneous amplitude at least in part proportional to the incremental-area image reflective brightness and to the prevailing peak intensity of said light spot, means for deriving a first electrical control signal having an amplitude proportional to the average prevailing peak intensity of said light spot and a second electrical control signal having an amplitude proportional to the prevailing image reflective peak brightness during scanning by said light spot, and means responsive to said contrlo signals for controlling said energizing source to vary inversely with changes in the amplitude of each thereof the multiplication ratio of said photo-multiplier tube to reduce variations in the peak amplitude of said generated video signal resulting from variations in the average peak intensity of said light spot and the reflective peak brightness of said image.

3. A video signal generator comprising means for creating and projecting onto an image to be transmitted a moving spot of light tracing a scan raster to explore incremental-area reflection brightness contrasts of said image, a source of electrical energization, a photo-multiplier tube energized by said source and responsive to light energy reflected from said image and modulated in intensity by the light-spot exploratory scanning thereof for generating an electrical video signal having an instantaneous amplitude at least in part proportional to the incremental-area image reflective brightness and to the prevailing peak intensity of said light spot, means for deriving a first electrical control signal having an amplitude proportional to the average prevailing peak intensity of said light spot and a second electrical control signal having an amplitude proportional to the prevailing image reflective peak brightness during scanning by said light spot, means responsive to said first control signal for controlling said energizing source to vary inversely with relatively slow changes in the amplitude of said first control signal the multiplication ratio of said photo-multiplier tube, and means responsive to said second control signal for additionally controlling said energizing source to vary inversely with relatively rapid changes in the amplitude of said second control signal the multiplication ratio of said photo-multiplier tube, thereby to reduce variations in the peak amplitude of said generated video signal resulting from variations in the average peak intensity of said light spot and the reflective peak brightness of said image.

4. A video signal generator comprising means for creating and projecting onto an image to be transmitted a moving spot of light tracing a scan raster to explore incremental-area reflection brightness contrasts of said image, a source of electrical energization, a photomultiplier tube energized by said source and responsive to light energy reflected from said image for generating an electrical video signal, means having a low-pass frequency-band translation characteristic and responsive to relatively slow changes in the peak amplitude of said video signal for controlling said energization source to vary the multiplication ratio of said tube inversely with said slow changes of said video signal peak amplitude, and means having a high-pass frequency-band translation characteristic and responsive to more rapid changes in the peak amplitude of said video signal for controlling said energizing source to vary the multiplication ratio of said tube inversely with said rapid changes of said video signal peak amplitude.

5. A video signal generator comprising means for creating and projecting onto an image to be transmitted a moving spot of light tracing a scan raster to explore incremental-area reflection brightness contrasts of said image, a source of electrical energization, a photomultiplier tube having plural electron multiplier electrodes energized by said source and having a photoemissive electrode responsive to light energy reflected from said image for generating an electrical video signal, means for amplifying said video signal, means having a low-pass frequency-band translation characteristic and responsive to relatively slow changes in the peak amplitude of said amplified video signal for controlling the energization supplied by said energization source to all of said electron-multiplier electrodes to vary the multiplication ratio of said tube inversely with said slow changes of said video signal peak amplitude, and means having a high-pass frequency-band translation characteristic and responsive to more rapid changes in the peak amplitude of said amplified video signal for controlling the energization supplied by said energizing source to plural low-level ones of said electron-multiplier electrodes to vary the multiplication ratio of said tube inversely with said rapid changes of said video signal peak amplitude.

6. A video signal generator comprising means for creating and projecting onto an image to be transmitted a moving spot of light tracing a scan raster to explore incremental-area reflection brightness contrasts of said image, a source of electrical energization, a photomultiplier tube energized by said source and responsive to light energy reflected from said image for generating an electrical video signal, a video peak detector and low-pass video amplifier responsive to relatively slow changes in the peak amplitude of said video signal for controlling said energization source to vary the multiplication ratio of said tube inversely with said slow changes of said video signal peak amplitude, and a video peak detector and high-pass video amplifier responsive to more rapid changes in the peak amplitude of said video signal for controlling said energizing source to vary the multiplication ratio of said tube inversely with said rapid changes of said video signal peak amplitude.

7. A video signal generator comprising means for creating and projecting onto an image to be transmitted a moving spot of light tracing a scan raster to explore incremental-area reflection brightness contrasts of said image; a source of electrical energization; a photomultiplier tube having plural electrodes individually energized to successively higher voltage by said source and responsive to light energy reflected from said image for generating an electrical video signal; a video peak detector and low-pass video amplifier responsive to relatively slow changes in the peak amplitude of said video signal for controlling said energization source to vary concurrently the magnitudes of energizations of all of said plural electrodes, and thus the multiplication ratio of said tube, inversely with said slow changes of said video signal peak amplitude; and a video peak detector and high-pass video amplifier responsive to more rapid changes in the peak amplitude of said video signal for controlling said energizing source to vary concurrently the energizations of a lower-voltage group of said electrodes, and thus the multiplication ratio of said tube, inversely with said rapid changes of said video signal peak amplitude.

8. A video signal generator comprising means including a cathode-ray tube for creating and projecting onto an image to be transmitted a moving spot of light tracing a scan raster to explore incremental-area reflection brightness contrasts of said image, a source of electrical energization, a photo-multiplier tube energized by said source and responsive to light energy reflected from said image for generating an electrical video signal, means having a low-pass frequency-band translation characteristic and responsive to relatively slow changes in the peak amplitude of said video signal for controlling said energization source to vary the multiplication ratio of said tube inversely with said slow changes of said video signal peak amplitude, and means having a high-pass frequency-band translation characteristic and responsive to more rapid changes in the peak amplitude of said video signal for controlling inversely therewith both the cathode-ray beam current of said cathode-ray tube and through said energizing source the multiplication ratio of said tube to reduce said rapid peak amplitude changes of said video signal.

9. A video signal generator comprising means for creating and projecting onto an image to be transmitted a moving spot of light tracing a scan raster to explore incremental-area reflection brightness contrasts of said image, a first photo-multiplier tube and first source of energization therefor to derive an electrical video signal in response to light energy reflected from said image, means responsive to peak amplitude changes of said video signal for controlling inversely therewith and through said first energizing source the multiplication ratio of said first tube, a second photo-multiplier tube and a second source of energization therefor to derive an electrical control signal having an amplitude varying both with the average peak brightness and fluctuating brightness of said light spot during a complete scan raster, means responsive to peak-brightness amplitude changes of said control signal for controlling inversely therewith and through said second energizing source the multiplication ratio of said second tube, and means for combining with opposite polarities the fluctuation-brightness amplitude changes of said control signal and said video signal to derive an output video signal having reduced amplitude changes caused by fluctuating brightness of said light spot.

References Cited by the Examiner

UNITED STATES PATENTS

| | | | |
|---|---|---|---|
| 3,002,048 | 9/1961 | Bailey | 178—7.2 |
| 3,170,032 | 2/1965 | Evans | 178—7.1 |

DAVID G. REDINBAUGH, *Primary Examiner.*

J. McHUGH, *Assistant Examiner.*